Dec. 25, 1945.    W. MUIR    2,391,438
TOOL DRIVER
Filed March 9, 1944    3 Sheets-Sheet 1

Inventor:
WILLIAM MUIR,
by: John E. Jackson
his Attorney.

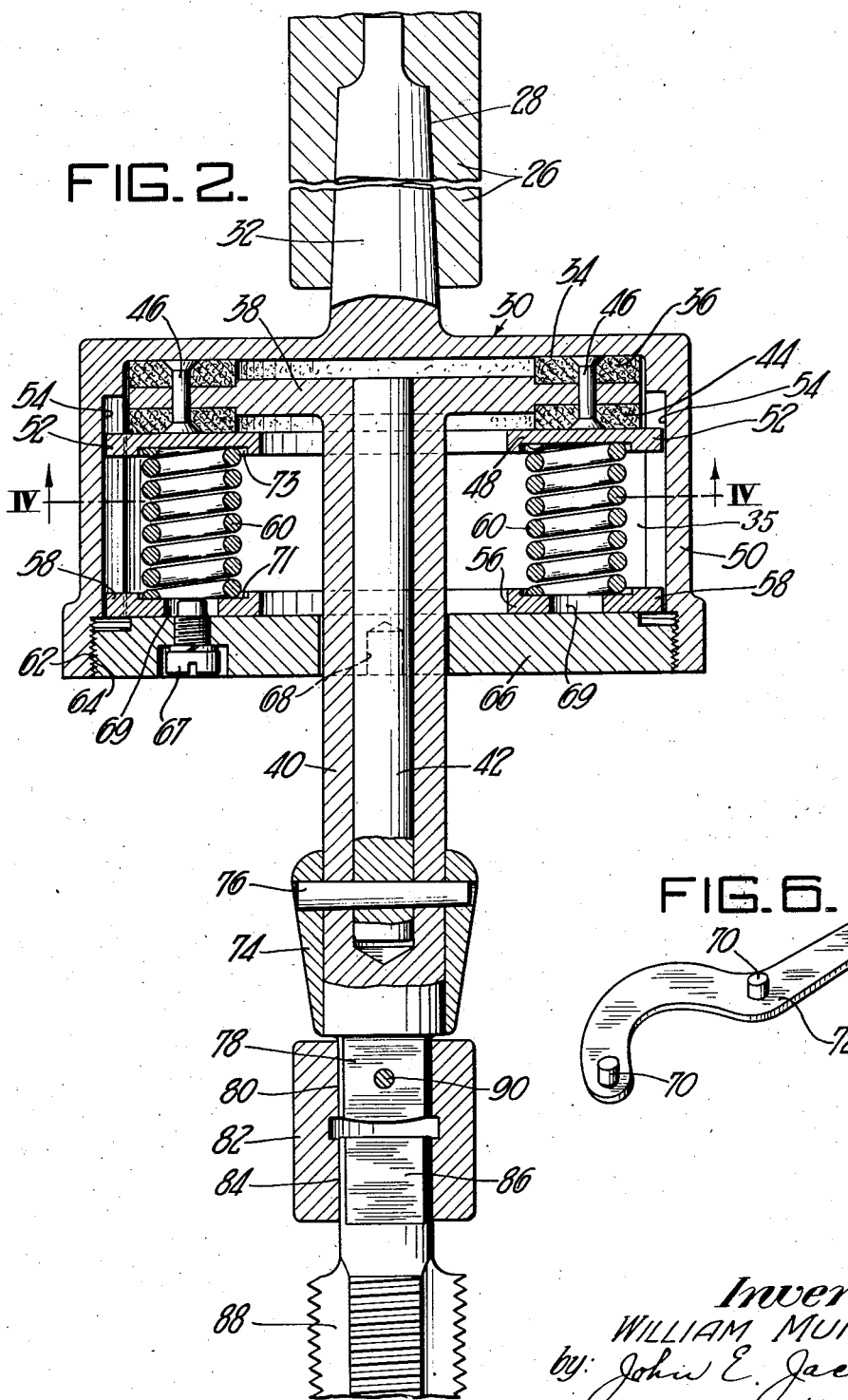

Dec. 25, 1945. W. MUIR 2,391,438
TOOL DRIVER
Filed March 9, 1944 3 Sheets-Sheet 3
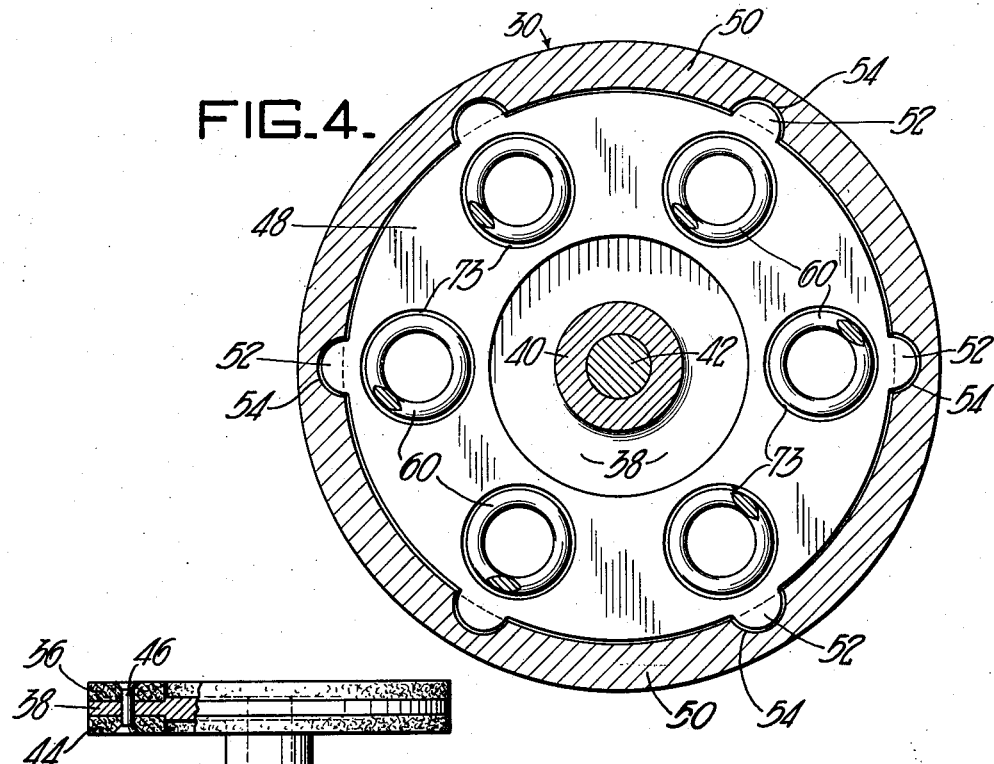
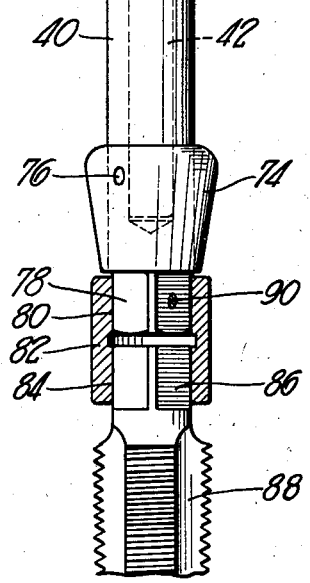
Inventor:
WILLIAM MUIR,
by: John E. Jackson
his Attorney.

Patented Dec. 25, 1945

2,391,438

UNITED STATES PATENT OFFICE 2,391,438

TOOL DRIVER

William Muir, Munhall, Pa.

Application March 9, 1944, Serial No. 525,752

2 Claims. (Cl. 10—135)

The present invention relates to an improved type of tool driver which, while not limited thereto, is peculiarly well suited for the power operation of taps used for threading holes in various workpieces.

The chief object of the invention is to safely speed up tapping operations.

Another object is to provide for transmitting the torque to a tap or other rotary cutting tool, in such a manner that when the cutting operation has progressed to a predetermined extent, the torque normally transmitted to the tool will be automatically interrupted.

A further, more detailed object of the invention is to provide improved means effective to automatically interrupt the transmission of driving torque to a tap when it reaches the bottom of the drilled hole, so as to prevent breakage.

A further object is to provide means for quickly centering a tap driver with the longitudinal axis of the hole to be tapped.

Although not limited thereto, the invention herein disclosed and claimed is peculiarly well suited for tapping the multiplicity of holes necessarily provided in the extremely hard steel of armor plate in the gun turrets of battleships. Frequently it is necessary that approximately a thousand holes be threaded in such hard armor plate turrets. A common practice followed for many years was to manually insert the tap into the drilled hole and to then turn the tap by hand by means of a double-ended wrench, at least six workmen usually being required, four working and two resting between their operating periods. Since approximately five taps slightly differing in size were required to thread a given hole properly, it is obvious that the prior art manual method was slow, tedious, costly, and inefficient. Moreover, due to the hardened or brittle character of the taps, they were frequently broken off in the hole, thereby slowing down production because of the necessity of removing the broken tap. The present invention solves the problem of broken taps, and also greatly speeds up the tapping operation or similar operations.

For a complete disclosure of the invention, reference should be made to the following detailed description, the accompanying drawings, and the appended claims.

In the drawings:

Figure 2 is an enlarged longitudinal section illustrative of the construction and arrangement of coacting parts constituting the essentials of the present invention.

Figure 4 is a section on line IV—IV of Figure 2, looking in the direction of the arrows.

Figure 5 is a detail view of the friction-driven element of the tool driver shown in Figure 2.

Figure 6 is a detail view of a spanner wrench for facilitating adjustment of the tool driver.

Figure 1:
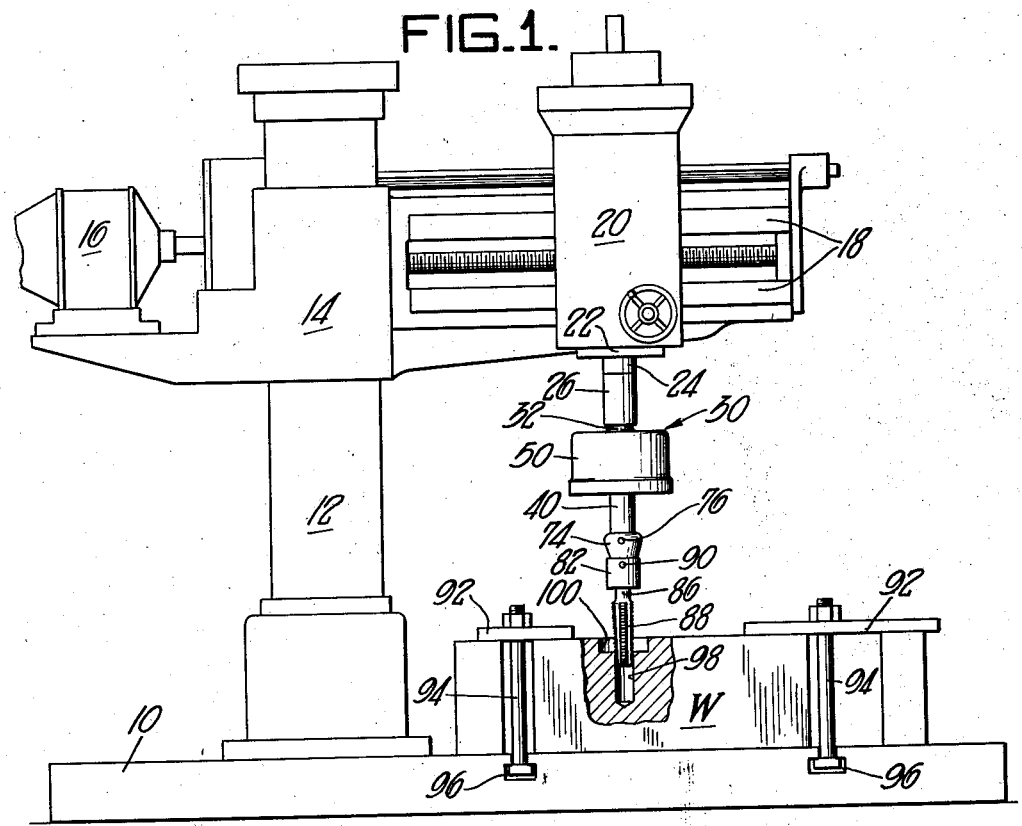
Figure 1 is a general view of a conventional form of radial drill press equipped with a device embodying the present invention.
Figure 3:
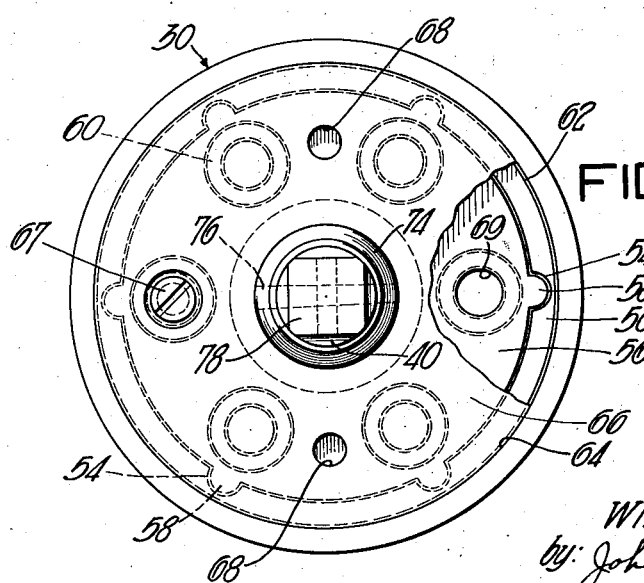
Figure 3 is an inverted plan view of Figure 2.

Referring in detail to the drawings, 10 represents the bed of a conventional form of radial drill press equipped with an upright pedestal 12 having vertically adjustable thereon a radial arm 14 carrying a drive motor 16. Slidable horizontally on ways 18 of the arm is a tool carriage 20 having a vertically adjustable tool slide 22 carrying a power-driven spindle 24 driven in any conventional manner from the drive motor 16 through driving connections well known to those skilled in the art and forming no part of the present invention.

Secured to the spindle 24 is a suitable chuck 26. This chuck is usually provided with a socket 28 having a standard taper. The improved device of the present invention includes a substantially cylindrical chambered housing 30 having an axially extending integral tapered shank 32 adapted to fit and be interlocked with the chuck 26 so that the torque of the spindle 24 is positively transmitted directly to the housing 30. The inner upper face 34 of the chamber 35 of the housing 30 is machined flat and true for coaction with a fiber ring 36 riveted or otherwise secured to a friction disc 38 formed integrally on an axially extending hub 40 within which there may be located a steel hub rigidifying rod 42. In some instances, however, the rod 42 may be omitted, since the hub wall can be of sufficient strength to resist the torsional strains.

To the lower face of the friction disc 38 is secured a fiber ring 44, the rings 36 and 44 being thus integrated with the friction disc 38 by rivets 46. A washer 48 coacts with the fiber disc 44, this washer being mounted with freedom for longitudinal movement relative to the outer cylindrical wall 50 of the housing by being interlocked therewith in such a manner as to compel the washer to partake of the rotary movement of the housing. As illustrated, the washer is provided with a plurality of spline-like projections 52 which slidingly engage complementary longitudinally-extending notches 54 formed in the interior wall of the housing, as shown. Spaced longitudinally from the washer 48 there is a similar washer 56 which is provided with spline projections 58, thus interlocking the latter washer with the notches 54 so as to transmit rotary motion of the housing to the washer and yet permit relative longitudinal movement of the washer. Interposed between the washers 48 and 56 there is a series of circularly spaced springs 60.

Means are provided for varying the magnitude of pressure exerted by the springs 60 against the friction disc 38 so as to permit of a precision adjustment effective to cause slippage between the housing 30 and the friction disc 38 after the tool powered by the driver has reached a predetermined position. To this end the lower extremity of the cylindrical wall 50 of the housing is formed with internal threads 62 for engagement with threads 64 formed on the exterior cylindrical edge face of a base plate 66 against which the washer 56 takes its bearing. The base plate is equipped with diametrically spaced holes 68 for engagement with pins 70 of a suitable spanner wrench 72, shown in Figure 6. It will be readily understood that by manipulating the base 66 with the spanner wrench or equivalent tool, the magnitude of pressure exerted by the springs can be readily varied to suit operating conditions or to compensate for wear on the fiber rings 36 and 44. A locking screw 67 equipped with a suitable lock washer, as shown, is threaded in a suitably tapped hole in the base plate 66, and the extremity of this screw is adapted to enter any one of a plurality of holes 69 formed in the washer 56 so as to lock the base 66 in any one of several positions of precision adjustment. As illustrated, there are six holes 69 formed in the washer 56 in axial alignment with the six depressed spring seats 71, also formed in the washer. The upper washer 48 is formed with similar recessed spring seats 73 for engagement with the upper ends of the springs 60, as shown.

Near its lower extremity the hub 40 carries a cone-like tapered pilot member 74 secured by a tapered pin 76. At the lower extremity of the hub just beyond the pilot member there is a squared shank 78 which is fitted to a square socket 80 formed in the upper end of an adaptor 82. This adaptor has a lower square socket 84 for engagement with the squared head 86 formed on the upper extremity of a tap 88. The adaptor is secured to the shank 78 by a suitable taper pin 90.

In normal operation a workpiece W to be tapped or have other operations performed thereon, is secured to the bed 10 by suitable clamps 92 by means of clamp bolts 94 whose heads engage T-slots 96 in the bed. The workpiece W will usually have a plurality of drilled holes 98 therein, many of which will be counterbored, as indicated at 100.

The axis of the spindle 24 is adapted to be quickly, easily and accurately aligned with the axis of the counterbore 100 or drilled hole 98 by initially manipulating the tool carriage 20 and the tool slide 22 manually in such manner as to cause the tapered pilot member 74 to engage the counterbore 100. Thus the housing and the tool driver are quickly centered with the hole to be tapped. After such accurate setting, the tool slide 22 will be elevated and the squared head 86 of the tap engaged with the socket 84 of the adaptor 82. The spindle 24 of the power drill press is then caused to rotate, by the operation of a conventional clutch control, and the tool slide 22 is fed downwardly. Thus the thread-cutting teeth of the tap will engage the periphery of the drilled hole 98 and the tap will be fed downwardly until such time as the extremity of the tap reaches the bottom of the drilled hole. Thereupon the friction disc 38 will slip relative to the end face of the housing. Thus the driving torque will be interrupted and one or more revolutions of the power-driven housing may take place after completion of the tapping operation without damage to either the tap or the work. This relative motion between the housing 30 and the hub 40 of the tool holder can be easily detected visually by the operator, and serves as a signal to denote the completion of the tapping operation. Such completion of the tapping operation can also be detected by the sense of touch, by placing the fingers on the hub 40, which is advantageous when working in poorly-lighted locations.

By manipulation or adjustment of the base 66, the requisite friction grip for a given size tap may be varied so that such tap will slip when it reaches the bottom of the hole. The construction and arrangement of the assemblage is such that it is practically accident- and fool-proof, and the friction members and springs and their adjusting means are all housed or enclosed in a practically oil-tight and dust-proof structure so that it is not necessary to change the friction adjustment for a given tool setting for a substantially indefinite time. The locking means 67 effectively maintains the parts in the desired positions of adjustment.

Compared to the antiquated hand-tapping practice heretofore in vogue for tapping holes, the present invention effects important economies. By the old method, an average of only fourteen holes of one and one-half inch diameter could be tapped in eight hours, requiring a minimum of seven men for the operation. Compared with this slow prior practice, the herein disclosed invention makes possible the tapping of an average of 35 holes of the same diameter and depth in an eight-hour day, requiring the services of only two workmen. The invention has proven to be a great time-saver in the tapping of holes for the roofs of turrets of modern battleships, since each turret in certain types of battleships requires the tapping of at least 1000 holes. Thus the invention constitutes an important contribution to the present war effort.

Although the invention has been described with particular reference to transmitting rotary motion from a rotary tool spindle to a tap, it will be understood that the invention may also be advantageously used for relieving the driving torque after a drill has been fed into the work for a predetermined distance. Also, the adaptor fitting 84 can be applied to receive a counterboring tool or an end milling tool, which tools can be caused to be relieved automatically of driving torque upon reaching a predetermined depth in the work. It is also contemplated that the adaptor can be engaged with the head of a bolt, so as to permit the use of the apparatus shown for screwing a bolt into a tapped hole until such time as the end of the bolt reaches the bottom of the bolt hole, whereupon the driving torque will be released automatically due to the slip connection between the housing 30 and the friction disc 38.

While I have described a preferred embodiment of the invention which an actual reduction to practice has demonstrated to effect important economies and possess great practical utility, it is not to be construed that I am limited thereto, since various modifications and substitutions of equivalents may be made by those skilled in the art without departure from the invention as defined in the appended claims.

I claim:

1. A device of the character described, comprising, in combination, a chambered housing, means for transmitting a torque thereto, a disc within said housing having friction facings secured to recessed seats formed in the upper and lower faces of said disc, means secured to said disc for engagement with a rotary cutting tool, an upper plate notched at its periphery for engagement with a rib formed on said housing, a similar lower notched plate, springs positioned in depressed seats formed in said plates and acting to press said disc into coaction with said housing, a base having a screw-threaded connection with said housing for varying the magnitude of pressure exerted by said springs, and a screw passing through said base and entering one of a series of apertures in said bottom plate.

2. A device of the character described, comprising, in combination, a chambered housing, means for transmitting a torque thereto, a friction disc within said housing having means secured thereto for engagement with a rotary cutting tool, a circular series of similar springs acting to press said disc into coaction with said housing, a base screwing to said housing for simultaneously varying the magnitude of pressure exerted by each of said springs, a plate slidable within said housing and interlocked therewith to prevent it from turning, and means carried by said base and engaging said plate for positively locking said base in various positions of adjustment.

WILLIAM MUIR.